US011948541B2

(12) United States Patent
Mahesh

(10) Patent No.: US 11,948,541 B2
(45) Date of Patent: Apr. 2, 2024

(54) TROMBONE FINGER POSITIONER AND GRIPPER

(71) Applicant: Mihir Mahesh, Irving, TX (US)

(72) Inventor: Mihir Mahesh, Irving, TX (US)

( * ) Notice: Subject to any disclaimer, the term of this patent is extended or adjusted under 35 U.S.C. 154(b) by 0 days.

(21) Appl. No.: 17/897,474

(22) Filed: Aug. 29, 2022

(65) Prior Publication Data

US 2023/0351984 A1 Nov. 2, 2023

Related U.S. Application Data

(60) Provisional application No. 63/335,236, filed on Apr. 27, 2022.

(51) Int. Cl.
*G10D 9/00* (2020.01)

(52) U.S. Cl.
CPC .................................... *G10D 9/00* (2013.01)

(58) Field of Classification Search
CPC .................................. G10D 3/00; G10D 9/00
See application file for complete search history.

(56) References Cited

U.S. PATENT DOCUMENTS 1,255,766 A 2/1918 Martens
3,834,268 A 9/1974 McCracken
5,656,788 A * 8/1997 Wise ........................ G10D 7/10 84/387 A

* cited by examiner

*Primary Examiner* — Kimberly R Lockett
(74) *Attorney, Agent, or Firm* — MAINLINE INTELLECTUAL PROPERTY; Syam Anand

(57) ABSTRACT

The present invention provides a trombone finger positioner, comprising a cylindrical structure, wherein said cylindrical structure having a pointer finger cut-out, a middle finger cut-out ,and a thumb cut-out; said cylindrical structure also incorporates a vertical cut and an opening along its full length; the pointer finger cut-out and middle finger cut-out have a major axis aligned along the Y-axis and the minor axis aligned along the X-axis, and the center of both the grooves are in the Y-axis; and said thumb cut-out is opposite to the middle finger cut-out and their centers are on the same axis.

2 Claims, 7 Drawing Sheets

TROMBONE FINGER POSITIONER AND GRIPPER

FIELD OF THE INVENTION

The present invention provides a trombone finger positioner and gripper. More particularly, the invention provides an ergonomically shaped snap-fit sleeve attachment for the slide brace to allow holding the trombone and positioning fingers in the right manner.

BACKGROUND OF THE INVENTION

A trombone is a large musical instrument of the brass family. The trombone consists of two long oval tubes, one of which can be pushed backward and forward to play different notes.

The performance of the trombone requires a strong internal sense of rhythm and time. The training augments these senses and combines them with physical aspects of playing the instrument, which includes achieving proper breathing technique, embouchure, and slide placement.

A proper breathing technique is paramount to control the pitch and volume, which is generated by blowing air through lips to generate sound.

The embouchure control or lipping is the controlled vibration of the lips to generate the desired pitch. The controlling factor of embouchure is the use of the top or bottom lip used in the mouthpiece of the trombone.

Slide placement is dependent on mouthpiece placement and is directly influenced by the weight and overall bulkiness of the trombone The slide precision requires the correct arm position and grip, and the correct arm motion. The arm is placed directly in front of the body slightly lower than parallel to the floor, then bent at the elbow bringing the palm and fingers of the slide hand to about four or five inches in front of the face. This establishes the elbow as the primary hinge in the slide arm. The grips require the slide brace to be firmly placed between the index finger and the middle finger, on the side farther from the body, and the thumb, on the other side closer to the body. The index and middle finger should always be in contact with the slide brace. The grip pressure should be only firm enough to control the slide placement without introducing any tension that may spread to other parts of the arm or shoulder. As the player acquires a feel for the placement of the slide into each of the seven primary positions, the arm that controls the slide should move with minimal points of variability and the fingers should maintain constant control of the slide placement. This allows for an environment where the trombone player can play at their peak capacity.

Now the proper slide position and timing are dependent on maintaining correct finger positioning and timing of the slide movements based on the requirements of the style of music to be performed. An incorrect or inconsistent grip on the slide is responsible for many players' struggles with slide technique. The trombone must maintain a firm, but not clenched, grasp of the hand slide. While the difficulties created by this deficiency may seem minor, it is important to remember that the transitions occur within a fraction of a second. Any faulty or mistimed movement of the slide can create a discrepancy.

Every year, a multitude of people start to learn how to play the trombone and struggle with proper slide precision and timing. These players tend to develop undesired habits in how they hold and play the trombone. Typically, many new players tend to hold their trombone side brace incorrectly. This is because the shape of the trombone slide brace is a narrow cylinder that can be held in multiple ways. New players tend to hold it in a way they feel comfortable with. However, there is a recommended correct way of holding it using only the first 3 fingers of the right hand. Holding the slide brace incorrectly may result in several undesirable effects. The player may not be at their full playing capacity and playing speed when they incorrectly hold the slide brace. In addition, they may apply undue pressure and forces on the slide, which may result in damage to the instrument in the long run. It would be helpful if trombone players can position their fingers easily and accurately on the trombone slide brace each time they play on the trombone.

In U.S. Pat. No. 1,255,766A, the invention relates to musical brass instruments, and its object is to provide new and improved trombone support for convenient attachment to a sliding trombone and arranged to support most of the weight of the instrument in the palm of the left hand of the player and to distribute the grip of the left hand equally to the several fingers thereof to enable the player to firmly support and grip the trombone without producing undue fatigue.

In U.S. Pat. No. 5,656,788A discloses a trombone guide for positioning the thumb and first two fingers of a trombonist on the slide bracing of the trombone to ensure correct slide technique In U.S. Pat. No. 3,834,268 provides a support structure for supporting a trombone in the hand of a player with the wrist and forearm of the player having an in-line position when supporting the trombone in a playing position includes a support means for engaging with the stationary slide member of the trombone. The support means includes a first surface portion for engaging with the palm of a player and supporting substantially the entire weight of the trombone in the palm of the player's hand and a second surface portion disposed of substantially parallel to the first surface portion for engaging with at least two of the fingers of the hand of the player. The support means further includes a third surface portion disposed of substantially perpendicular to the first and second surface portions for engaging with the thumb of the hand of the player. The second and third surface portions cooperate with the fingers and thumb respectively of the player's hand to control the angular orientation of the trombone relative to the player while the weight thereof is supported by the first surface portion of the palm of the player's hand. The support means enables the player to support the trombone in a position that renders the player less susceptible to fatigue than known trombone supports.

In playing trombone, an efficient and desired harmony may be achieved by holding the slide brace in an ideal position. Since trombones are available in different sizes the ideal position will vary depending on the trombonist's muscle memory to place their fingers and thumb in right place irrespective of the size. The need for muscular precision is particularly apparent in playing the trombone. If the trombonist's fingers and thumbare aligned properly over the slide brace, the developed harmony will also be ideal.

The said prior arts provide trombone guides with a plurality of upward and downward slopes which assist in the positioning of fingers and thumbs. Once said trombone guide is installed, there is no direct contact of fingers and thumb with the trombone guide, and is mostly used to hold the trombone rather than placement of fingers.

In this context, it is required that a trombone finger positioner is needed to overcome the drawback of cited technologies. Further, a trombone finger positioner is required that helps in training and building muscle memory for placing the fingers and thumb at the right places while applying the right amount of pressure to augment proper sliding technique, so that with prolonged usage the correct sliding and holding technique is achieved even when the trombone finger positioner is not mounted.

SUMMARY OF THE INVENTION

Accordingly, to overcome the drawbacks of the prior art, the main object of the present invention is to provide an ergonomically shaped snap-fit trombone finger positioner that corrects and trains the position of the right hand, the hand that is holding the slide brace, to the way that professionals recommend positioning the hand.

Another object of the present invention is to provide a trombone finger positioner that avoids the application of undue pressure on the slide, which may result in damage to the instrument or jeopardize performance.

Yet another object of the present invention is to provide a trombone finger positioner that enables any player to position their fingers easily and accurately on the trombone slide brace of the trombone.

Yet another object of the present invention is to provide a trombone finger positioner that helps in adopting correct muscle memory for placing fingers and thumb in the right place.

In carrying out the above objects of the present invention, one embodiment of the present invention provides a trombone finger positioned having a cylindrical structure. The trombone finger positioner is made up of a flexible material such as silicone, reinforced leather, rubber, plastic, etc. that has a structure compatible to be reversibly fitted to the side brace. The finger positioner has an axial cut, to allow snapped fitting to the compatible surface such as the slide brace of the trombone's slide assembly, and a plurality of elliptical grooves/cut-outs for correctly positioning the fingers on the slide brace. The finger positioner, once snap-fitted to the slide brace, allows correct accommodation of the fingers and thumb of a player, by allowing placement of the fingers in the elliptical grooves/cut-outs. The plurality of grooves/cut-outs is positioned in such a way, that placing fingers over the grooves/cut-outs shall restrict the accommodation of the finger in the elliptical grooves/cut-outs, thereby correctly aligning the position of the fingers and thumb allowing the player to execute the proper slide technique.

In another embodiment, the first groove/cut-out for the pointer finger is located at the center of the axial cut to accommodate the pointer finger, and another groove/cut-out adjacent to the first groove/cut-out in the same axis to accommodate the middle finger. The size of the finger's groove/cut-out is the same and their centers are on the same axis. The thumb's groove/cut-out is provided opposite the middle finger's groove/cut-out and their centers are on the same axis.

In another embodiment, the trombone finger positioner is provided in different sizes to accommodate players with small or large fingers. Based on the player's finger size the grooves/cut-outs for the pointer finger and middle finger have a diameter from ⅓ inches to ⅔ inches, and their depths are both ⅖ inches. The grooves/cut-outs for the thumb have a varying diameter from ½ inches to one inch.

BRIEF DESCRIPTION OF THE DRAWING

The object of the invention may be understood in more detail and a more particular description of the invention is briefly summarized above by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF THE INVENTION

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Figure 1:
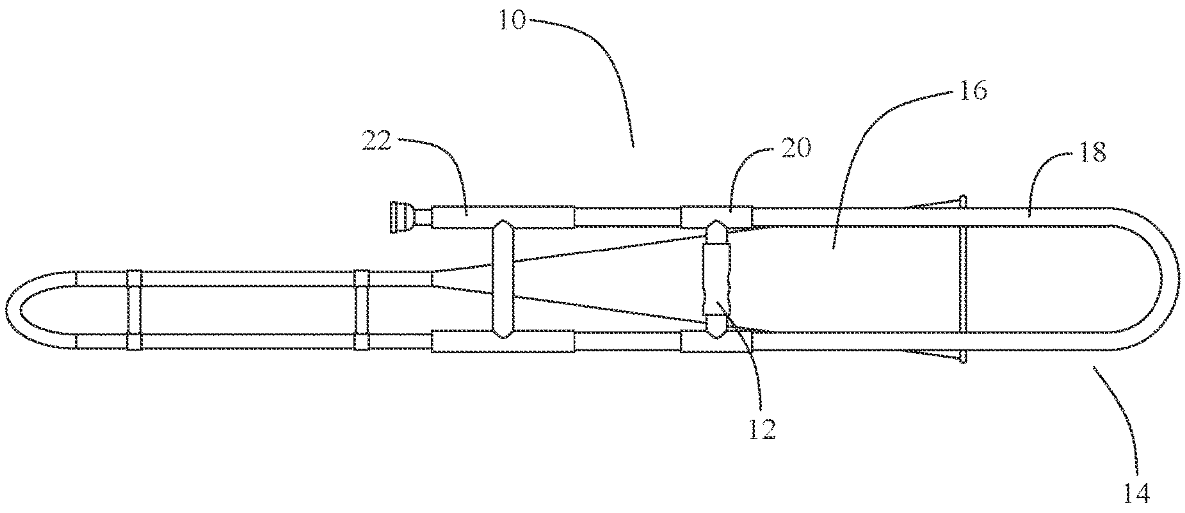
FIG. 1 is a side view of the trombone finger positioner mounted on the slide brace of a trombone.

Referring to FIG. 1 illustrates a trombone 10 having a trombone finger positioner 12 as the main embodiment of the present invention. The trombone finger positioner 12 can be snapped fitted. The trombone 10 comprises a slide assembly 14 attached to a bell assembly 16. The slide assembly 14 includes an outer slide member 18 and a slide brace 20. The outer slide member 18 is movable relative to the stationary slide member 22 in a known manner. The slide brace 20 is gripped by the hand of a player and moved relative to the stationary slide 22 to affect the movement of the movable slide member 18. Many new players tend to hold their trombone slide brace 20 incorrectly because of the shape of the trombone slide brace 20, which is essentially a narrow cylinder that can be held in multiple ways. Holding the slide brace 20 incorrectly may result in several undesirable effects. The player may not be at their full playing capacity and playing speed when they incorrectly hold the slide brace 20. In addition, they may apply undue pressure and forces on the slide, which may result in damage to the instrument in the long run.

Figure 2:
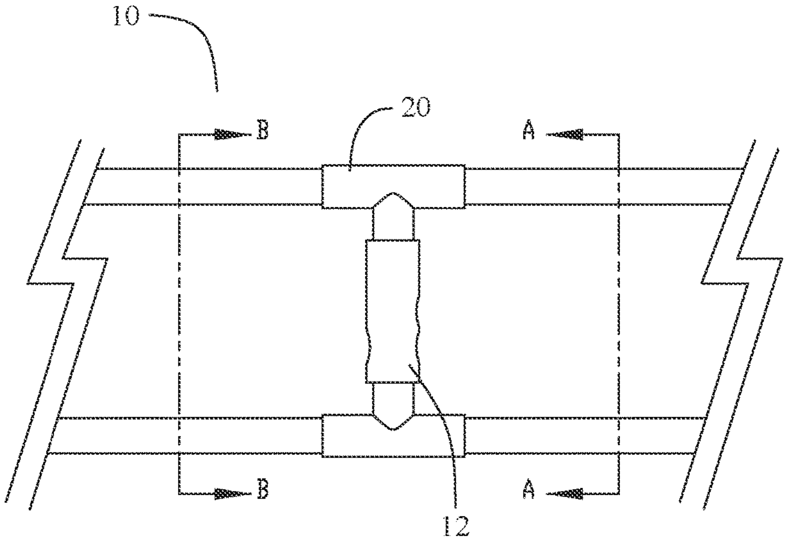
FIG. 2 is a cropped view of the trombone finger positioner mounted on the slide brace of a trombone.

Referring to FIG. 2 which illustrates a cropped view of the trombone finger positioner 12 mounted on the slide brace 20 of a trombone. The trombone finger positioner 12 is a new invention designed to train trombone players, new and experienced, to hold the trombone slide brace 20 as recommended. The design of the trombone finger positioner 12 is such that it does not interfere with operating the trombone 10 without altering the quality of sound and it does not add excess weight to the instrument. The trombone finger positioner 12 ergonomic shapes helps new players learn the right way to hold a trombone 10, and experienced players to stop using the wrong way to hold the trombone 10.

Figure 3:
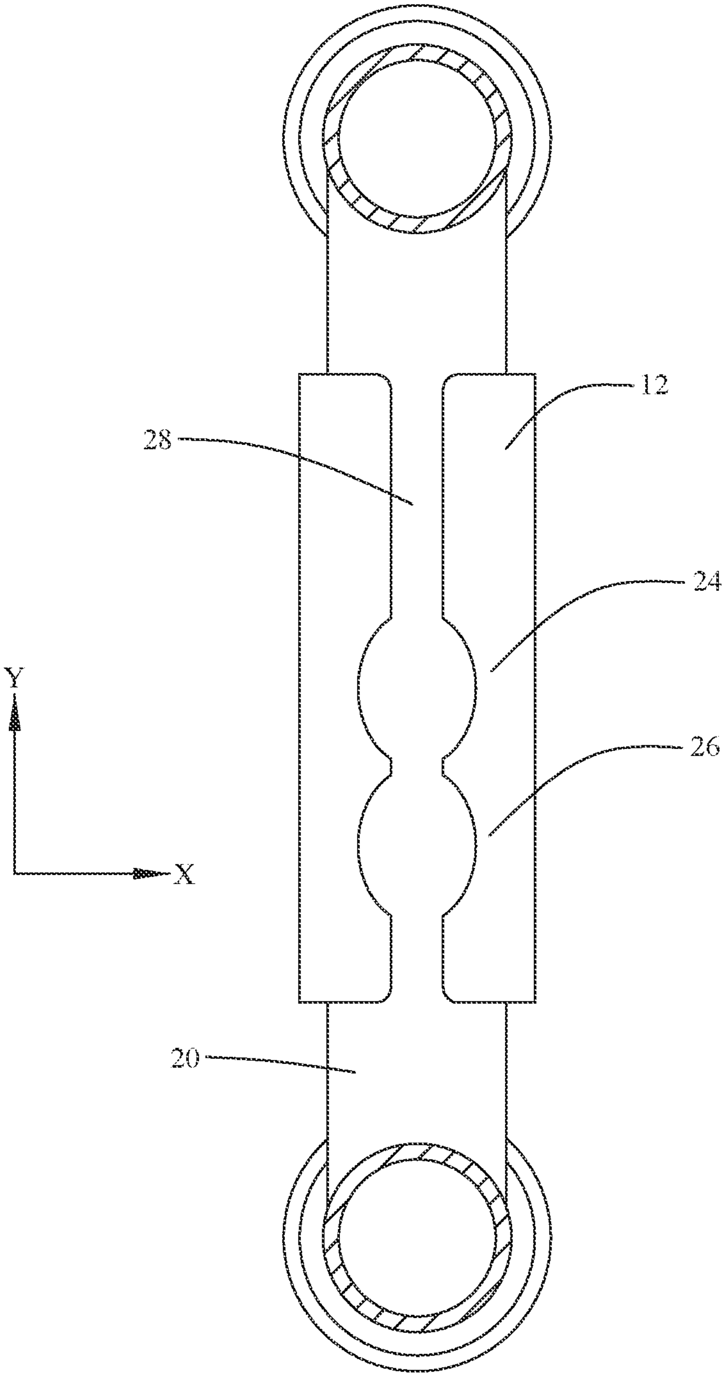
FIG. 3 is a sectional view taken along lines A-A of FIG. 2 showing finger grooves/cut-outs of trombone finger positioner mounted on the slide brace of a trombone.

Referring to FIG. 3 is a sectional viewtaken along lines A-A of FIG. 2 illustrating the location of the pointer finger groove/cut-out 24 and middle finger groove/cut-out 26 of trombone finger positioner 12 mounted on the slide brace 20 of a trombone. The grooves/cut-outs 24, 26 are elliptical with their major axis aligned along Y-axis and minor axis aligned along the X-axis. Further, the center of both the grooves/cut-outs 24, 26 are on the Y-axis. Further, an axial cut 28 and an opening 32 are provided to allow it to be snapped on the slide brace 20 of the trombone's slide assembly.

In the present embodiment, the axial cut 28 is shown running through the center of the finger's grooves/cut-outs 24, 26, however, other variations of the current design are possible wherein the axial cut 28 can be positioned away in any direction i.e. clockwise or anti-clockwise from the center axis of grooves/cut-outs 24, 26 without affecting the functionality of trombone finger positioner 12.

Figure 4:
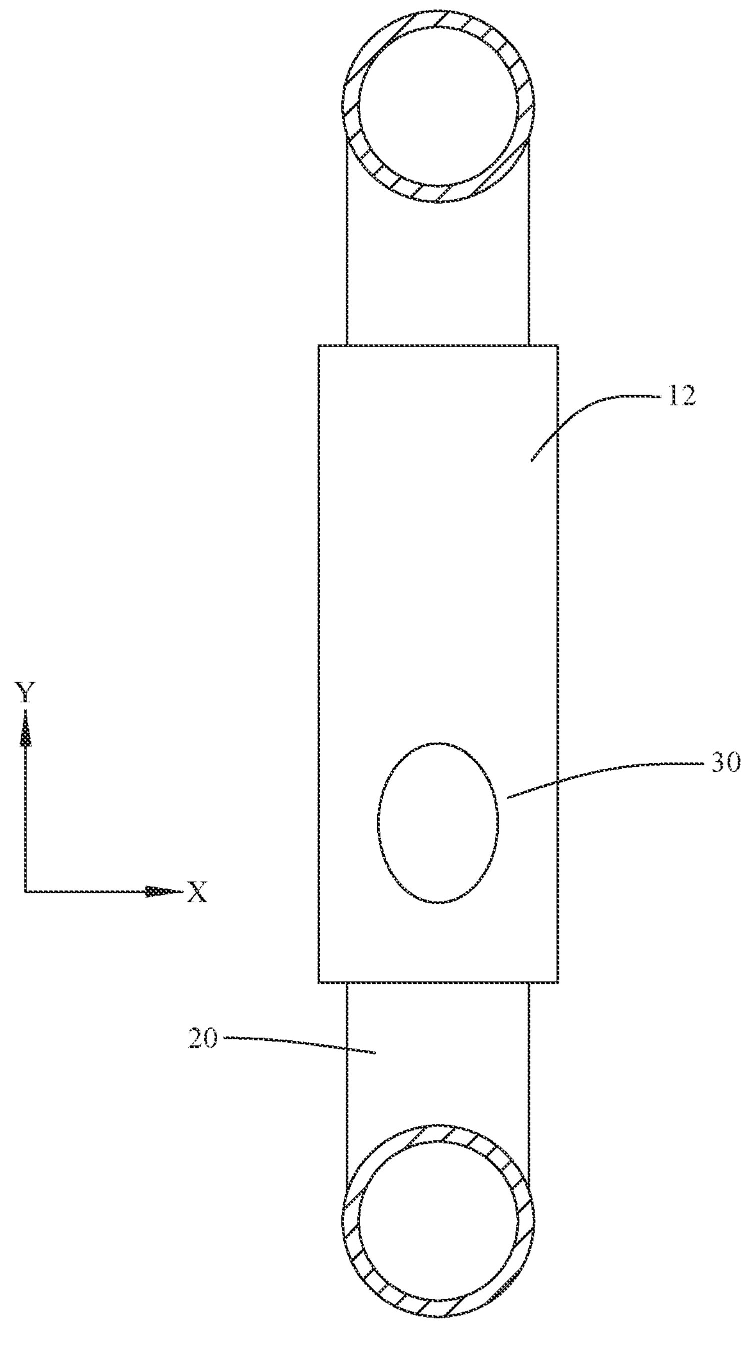
FIG. 4 is a sectional view taken along lines B-B of FIG. 2 showing thumb grooves/cut-outs of trombone finger positioner mounted on the slide brace of a trombone.

Referring to FIG. 4 is a sectional viewtaken along lines B-B of FIG. 2 showing thumb groove/cut-out 30 of trombone finger positioner 12 mounted on the slide brace 20 of a trombone. The thumb groove/cut-out 30 is elliptical with its major axis aligned along Y-axis and minor axis aligned along the X-axis. Furthermore, the center of the thumb groove/cut-out 30 and middle finger groove/cut-out 26 are aligned on the X-axis.

In FIG. 3 and FIG. 4, the shape and characteristics of a plurality of groove/cut-outs are described. One key feature of the grooves/cut-outs is to allow the trombonist fingers and thumb extremities to directly contact the slide brace when the trombone finger positioner 12 is applied. The trombone finger positioner 12 helps in developing and adopting a precise muscle memory over some time for correctly placing and gripping the trombone by applying the right amount of pressure. Once the muscle memory is developed, the trombonist can exclude the use of the trombone finger positioner and can practice or play on a variety of trombones irrespective of their sizes.

Figure 5:
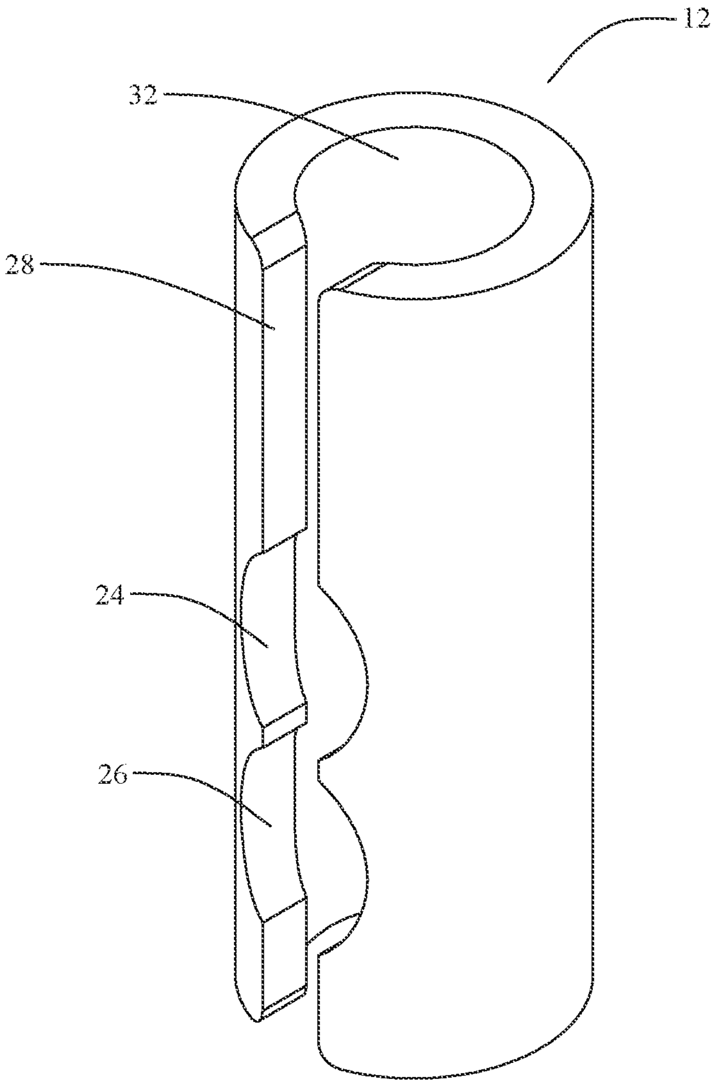
FIG. 5 is a perspective view of the trombone finger positioner.

Referring to FIG. 5 is a perspective view of trombone finger positioner 12 made up of flexible materials such as but not limited to silicone, reinforced leather, rubber, plastic, etc, and has a cylindrical structure. The trombone finger positioner 12 facilitates the correct holding of a slide brace by providing a plurality of finger grooves/cut-outs 24, 26 where the players hold their slide accurately and help in developing a habit on how to hold a slide brace accurately and properly. In an embodiment, the trombone finger positioner 12 is approximately two inches high, ¾ inch in diameter, and about ⅛ inch thick. Further, it incorporates an axial cut 28 and an opening 32 running along full length to allow it to be snapped onto the slide brace. The opening 32 has a set circumference for releasably receiving a portion of a trombone slide.

Figure 6:
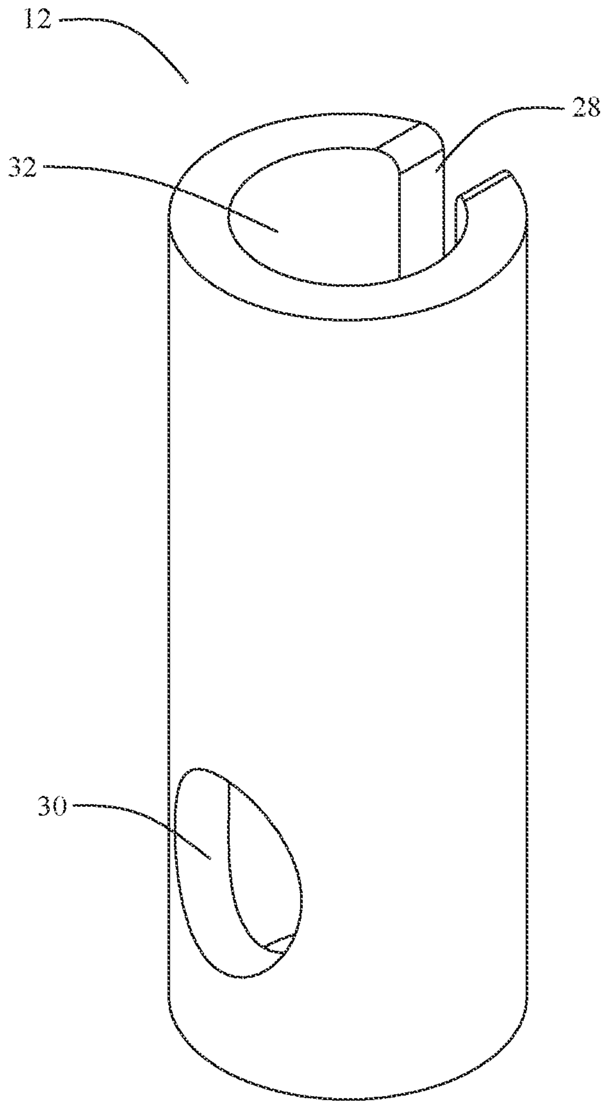
FIG. 6 is another perspective view of the trombone finger positioner.

Referring to FIG. 6 is another perspective view of the trombone finger positioner 12 according to the embodiment of the present invention. The trombone finger positioner 12 facilitates the correct holding of a slide brace by providing a thumb groove/cut-out 30 where the players hold their slide accurately and help in developing a habit on how to hold the slide brace accurately and properly.

Figure 7:
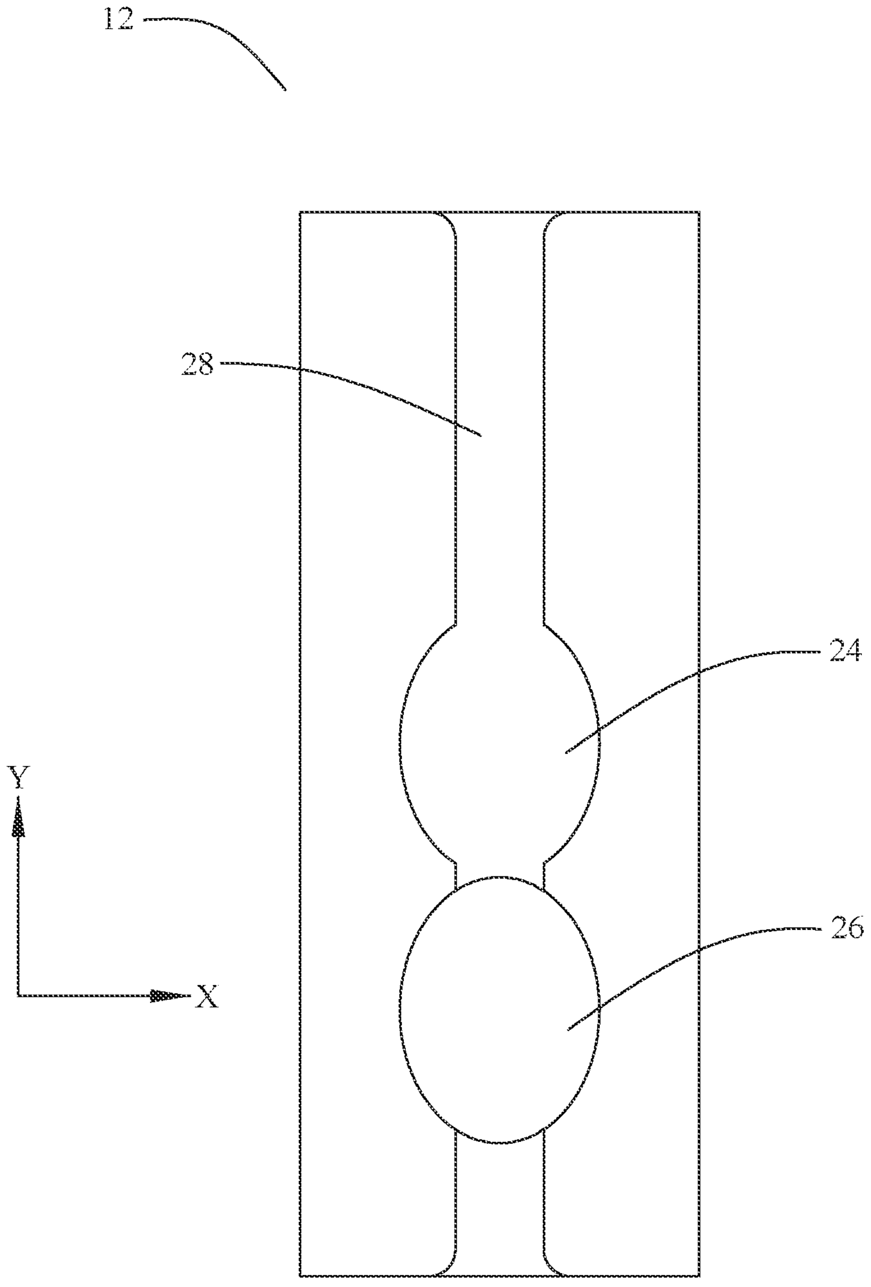
FIG. 7 is a front view of the trombone finger positioner.
Figure 8:
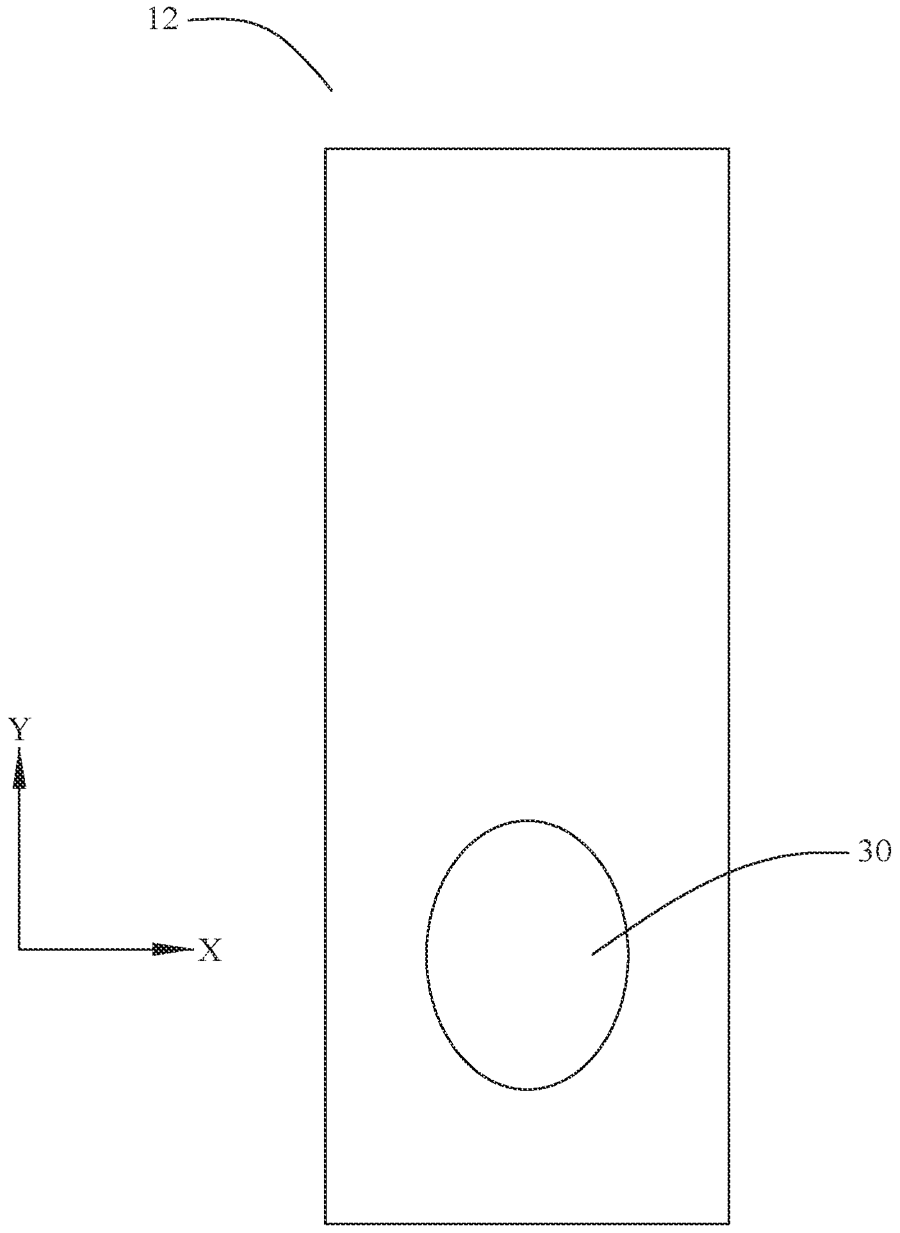
FIG. 8 is a back view of the trombone finger positioner.

Referring to FIG. 7 and FIG. 8 shows a front and back view of the trombone finger positioner 12 according to the embodiment of the present invention. It can be figured out from the figures that the finger's groove/cut-out will be the same and their center will be on the same Y-axis. Further, the thumb's groove/cut-out is provided opposite the middle finger's groove/cut-out and their centers are on the same X-axis.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications, and substitutions, in addition to those outlined in the above paragraphs, are possible. Those skilled in the art will appreciate that various adaptations and modifications of the just described embodiments can be configured without departing from the scope and spirit of the invention.

What is claimed is:

1. A trombone finger positioner, comprising a cylindrical structure to be applied on slave brace, wherein said cylindrical structure is having a pointer finger cut-out, a middle finger cut-out, and a thumb cut-out;

the pointer finger cut-out and the middle finger cut-out have major axis aligned along Y-axis and minor axis aligned along X-axis, and center of both the cut-outs is in Y-axis, said thumb cut-out is on the opposite side of the middle finger cut-out and their centers are on the same axis, and placing pointer finger, middle finger and thumb over the cut-outs allow fingers and thumb extremities to be placed directly in contact with the slide brace and applying pressure directly on the slide brace.

2. A trombone finger positioner as claimed in claim 1, wherein an axial cut and an opening allowing it to be snapped onto the slide brace.

* * * * *